UNITED STATES PATENT OFFICE.

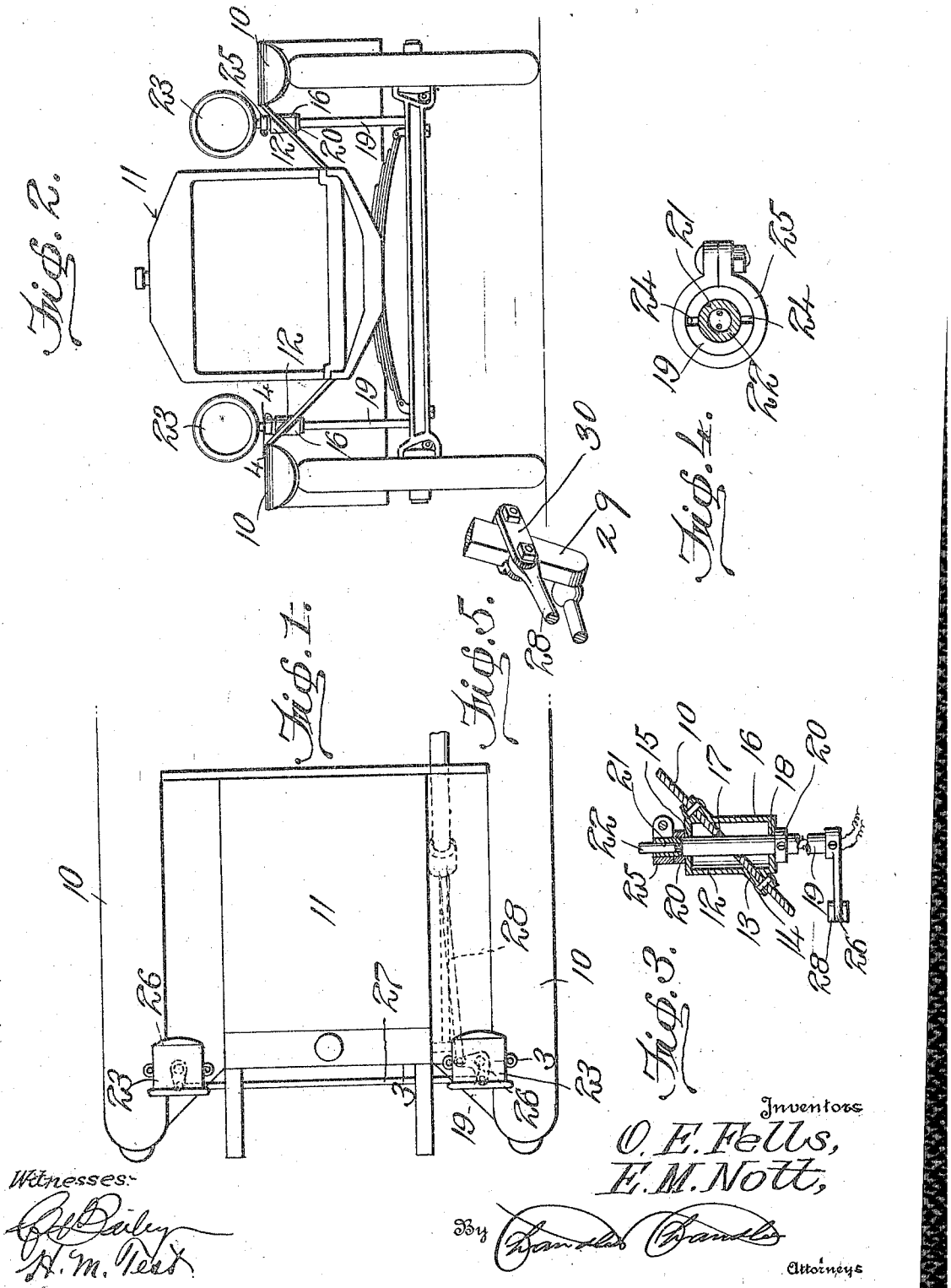

ORLEY E. FELLS AND EVERETT M. NOTT, OF CODY, WYOMING.

LAMP-SUPPORT FOR AUTOMOBILES.

1,233,655.

Specification of Letters Patent. Patented July 17, 1917.

Application filed November 7, 1916. Serial No. 130,097.

*To all whom it may concern:*

Be it known that we, ORLEY E. FELLS and EVERETT M. NOTT, citizens of the United States, residing at Cody, in the county of Park, State of Wyoming, have invented certain new and useful Improvements in Lamp-Supports for Automobiles; and we do hereby declare the following to be a full, clear, and exact description of the invention, such as will enable others skilled in the art to which it appertains to make and use the same.

This invention relates to automobile lamp supports.

One object of the present invention is to provide a novel and improved device for supporting the headlight lamps of the automobile so that the same will turn with the front wheels of the automobile.

Another object is to provide a device of this character having novel and simple means for properly supporting the brackets on the front fenders or wheel guards of the automobile.

Other objects and advantages will be apparent from the following description when taken in connection with the accompanying drawing.

In the drawing:

Figure 1 is a top plan view of the front portion of an automobile showing the application of my improved lamp supports.

Fig. 2 is a front elevation of the same.

Fig. 3 is a vertical transverse sectional view taken on the line 3—3 of Fig. 1.

Fig. 4 is a horizontal sectional view taken on the line 4—4 of Fig. 2.

Fig. 5 is a detail perspective view of connection between the steering rod and the lamps.

Referring particularly to the accompanying drawing 10 represents the front mud guards of the automobile 11, and in connection with which my invention is particularly adapted for attachment.

Secured to the inner inclined face of each of the guards is an inverted truncated-cylindrical casing 12, the same being formed with latterally extending flanges 13 which are riveted to the guard, as shown at 14. The casing is hollow and has in the upper end wall an opening 15, for a purpose which will appear later. To the outer inclined face of the guard is a similar truncated-cylindrical casing, but standing in its proper upright position, as shown at 16. Through the guard between the casings there is formed an opening 17, and in the bottom wall of the outer casing 16 is formed an opening 18, similar to the opening 15 and in vertical alinement therewith. A vertical shaft 19 is disposed through the opening in the guard and through the openings in the casings, suitable collars 20 being carried by the shaft to prevent vertical movement thereof, while permitting free rotary movement.

The upper portion of the shaft is hollow, as shown at 21, to receive the stem 22 of the lamp 23, the wires 23' being also passed upwardly therethrough to the lamps, for conveying electric current thereto. Said shaft is split at 24, and is provided with a clamping collar 25 to securely hold the stem within the shaft.

The lower end of each of the shafts is provided with a crank member 26, to one arm of each one of which is pivotally connected a link 27, which extends transversely under the frame of the automobile, this link constituting the steering rod of the lamps. To the other arm of one of the members 26, is pivotally connected one end of a rod 28 which extends to and is connected with the arm 29 of the steering post, by means of a clamp 30.

What is claimed is:

The combination with the front guard of an automobile having an opening therethrough, of a truncated-cylindrical casing secured to the inner inclined face of the guard and covering the opening, the upper end wall of the casing being formed with an opening, a truncated-cylindrical casing secured to the outer face of the guard, the bottom wall of said casing having an opening, and a lamp stem supporting shaft vertically disposed and rotatably arranged through the openings of the casings and the opening of the guard.

In testimony whereof, we affix our signatures, in the presence of two witnesses.

ORLEY E. FELLS.
EVERETT M. NOTT.

Witnesses:
C. L. BRADY,
F. BOKOP.

Copies of this patent may be obtained for five cents each, by addressing the "Commissioner of Patents, Washington, D. C."